United States Patent
Eryurek et al.

(10) Patent No.: US 6,772,036 B2
(45) Date of Patent: Aug. 3, 2004

(54) CONTROL SYSTEM USING PROCESS MODEL

(75) Inventors: Evren Eryurek, Minneapolis, MN (US); Kadir Kavaklioglu, Edina, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 96 days.

(21) Appl. No.: 09/943,333

(22) Filed: Aug. 30, 2001

(65) Prior Publication Data

US 2003/0045962 A1 Mar. 6, 2003

(51) Int. Cl.[7] .............................................. G06F 19/00
(52) U.S. Cl. ...................... 700/127; 700/128; 162/49; 162/238; 162/252; 162/262
(58) Field of Search ............................... 700/127, 128; 162/49, 238, 252, 262

(56) References Cited

U.S. PATENT DOCUMENTS

| | | | |
|---|---|---|---|
| 3,096,434 A | 7/1963 | King .......................... 235/151 |
| 3,404,264 A | 10/1968 | Kugler ....................... 235/194 |
| 3,468,164 A | 9/1969 | Sutherland ................... 73/343 |
| 3,590,370 A | 6/1971 | Fleischer ..................... 324/51 |
| 3,618,592 A | 11/1971 | Stewart et al. ............. 128/2.05 |
| 3,688,190 A | 8/1972 | Blum ........................ 324/61 R |
| 3,691,842 A | 9/1972 | Akeley ..................... 73/398 C |
| 3,701,280 A | 10/1972 | Stroman ....................... 73/194 |
| 3,849,637 A | 11/1974 | Caruso et al. ............... 235/151 |
| 3,855,858 A | 12/1974 | Cushing ....................... 73/194 |
| 3,952,759 A | 4/1976 | Ottenstein .................... 137/12 |
| 3,973,184 A | 8/1976 | Raber .......................... 324/51 |
| RE29,383 E | 9/1977 | Gallatin et al. ............... 137/14 |
| 4,058,975 A | 11/1977 | Gilbert et al. .............. 60/39.28 |
| 4,099,413 A | 7/1978 | Ohte et al. .................... 73/359 |
| 4,102,199 A | 7/1978 | Talpouras ..................... 73/362 |
| 4,122,719 A | 10/1978 | Carlson et al. ................ 73/342 |
| 4,249,164 A | 2/1981 | Tivy ........................ 340/870.3 |
| 4,250,490 A | 2/1981 | Dahlke ................... 340/870.37 |
| 4,279,013 A | 7/1981 | Cameron et al. ........... 364/105 |
| 4,337,516 A | 6/1982 | Murphy et al. ............. 364/551 |
| 4,399,824 A | 8/1983 | Davidson .................... 128/736 |
| 4,417,312 A | 11/1983 | Cronin et al. ............... 364/510 |
| 4,517,468 A | 5/1985 | Kemper et al. ............... 290/52 |
| 4,528,869 A | 7/1985 | Kubo et al. ................... 74/695 |

(List continued on next page.)

FOREIGN PATENT DOCUMENTS

| | | |
|---|---|---|
| CA | 999950 | * 11/1976 |
| DE | 32 13 866 A1 | 10/1983 |
| DE | 35 40 204 C1 | 9/1986 |

(List continued on next page.)

OTHER PUBLICATIONS

International Search Report for International application No. PCT/US 02/14934, filed May 8, 2002, Search Report dated Apr. 28, 2002.

(List continued on next page.)

*Primary Examiner*—Leo Picard
*Assistant Examiner*—Michael D Masinick
(74) *Attorney, Agent, or Firm*—Westman, Champlin & Kelly, P.A.

(57) ABSTRACT

A control system is provided for controlling a process for making paper or paper pulp. The process has a process product output at an end of the process. The controls include a process variable sensor input configured to receive a process variable related to the process. The controller is configured to provide a control signal to control the process. A process model has a model product output which is a model representation of the process product output. The model process output is a function of the sensed process variable and a product output setpoint representative of a desired process product output. The control signal is a function of the product output setpoint and the modeled product output.

18 Claims, 3 Drawing Sheets

U.S. PATENT DOCUMENTS

| | | | |
|---|---|---|---|
| 4,530,234 A | 7/1985 | Cullick et al. ................ 73/53 |
| 4,540,468 A * | 9/1985 | Genco et al. ................ 162/49 |
| 4,571,689 A | 2/1986 | Hildebrand et al. ........ 364/481 |
| 4,635,214 A | 1/1987 | Kasai et al. ................ 364/551 |
| 4,642,782 A | 2/1987 | Kemper et al. ............. 364/550 |
| 4,644,479 A | 2/1987 | Kemper et al. ............. 364/550 |
| 4,649,515 A | 3/1987 | Thompson et al. ......... 364/900 |
| 4,668,473 A | 5/1987 | Agarwal ...................... 422/62 |
| 4,707,796 A | 11/1987 | Calabro et al. ............. 364/552 |
| 4,720,806 A | 1/1988 | Schippers et al. ......... 364/551 |
| 4,736,367 A | 4/1988 | Wroblewski et al. ......... 370/85 |
| 4,736,763 A | 4/1988 | Britton et al. ................ 137/10 |
| 4,758,308 A * | 7/1988 | Carr .......................... 162/263 |
| 4,777,585 A | 10/1988 | Kokawa et al. ............. 364/164 |
| 4,807,151 A | 2/1989 | Citron ........................ 364/510 |
| 4,818,994 A | 4/1989 | Orth et al. ............. 340/870.21 |
| 4,831,564 A | 5/1989 | Suga ...................... 364/551.01 |
| 4,841,286 A | 6/1989 | Kummer ..................... 340/653 |
| 4,853,693 A | 8/1989 | Eaton-Williams ........... 340/588 |
| 4,873,655 A | 10/1989 | Kondraske ................. 364/553 |
| 4,907,167 A | 3/1990 | Skeirik ....................... 364/500 |
| 4,924,418 A | 5/1990 | Bachman et al. ........... 364/550 |
| 4,934,196 A | 6/1990 | Romano ................. 73/861.38 |
| 4,939,753 A | 7/1990 | Olson ......................... 375/107 |
| 4,964,125 A | 10/1990 | Kim ......................... 371/15.1 |
| 4,988,990 A | 1/1991 | Warrior ..................... 340/25.5 |
| 4,992,965 A | 2/1991 | Holter et al. ........... 364/551.01 |
| 5,005,142 A | 4/1991 | Lipchak et al. ............. 364/550 |
| 5,019,760 A | 5/1991 | Chu et al. ................... 318/490 |
| 5,043,862 A | 8/1991 | Takahashi et al. .......... 364/162 |
| 5,053,815 A | 10/1991 | Wendell ..................... 355/208 |
| 5,067,099 A | 11/1991 | McCown et al. ........... 364/550 |
| 5,081,598 A | 1/1992 | Bellows et al. ............. 364/550 |
| 5,089,979 A | 2/1992 | McEachern et al. ... 364/571.04 |
| 5,089,984 A | 2/1992 | Struger et al. ............... 395/650 |
| 5,098,197 A | 3/1992 | Shepard et al. ............. 374/120 |
| 5,099,436 A | 3/1992 | McCown et al. ........... 364/550 |
| 5,103,409 A | 4/1992 | Shimizu et al. ............. 364/556 |
| 5,111,531 A | 5/1992 | Grayson et al. .............. 395/23 |
| 5,121,467 A | 6/1992 | Skeirik ......................... 395/11 |
| 5,122,794 A | 6/1992 | Warrior ................... 340/825.2 |
| 5,122,976 A | 6/1992 | Bellows et al. ............. 364/550 |
| 5,130,936 A | 7/1992 | Sheppard et al. ...... 364/551.01 |
| 5,134,574 A | 7/1992 | Beaverstock et al. .. 364/551.01 |
| 5,137,370 A | 8/1992 | McCullock et al. ......... 374/173 |
| 5,142,612 A | 8/1992 | Skeirik ......................... 395/11 |
| 5,143,452 A | 9/1992 | Maxedon et al. ........... 374/170 |
| 5,148,378 A | 9/1992 | Shibayama et al. .... 364/551.07 |
| 5,150,289 A * | 9/1992 | Badavas ...................... 700/34 |
| 5,167,009 A | 11/1992 | Skeirik ......................... 395/27 |
| 5,175,678 A | 12/1992 | Frerichs et al. ............. 364/148 |
| 5,193,143 A | 3/1993 | Kaemmerer et al. ......... 395/51 |
| 5,197,114 A | 3/1993 | Skeirik ......................... 395/22 |
| 5,197,328 A | 3/1993 | Fitzgerald ................... 73/168 |
| 5,212,765 A | 5/1993 | Skeirik ......................... 395/11 |
| 5,214,582 A | 5/1993 | Gray ...................... 364/424.03 |
| 5,224,203 A | 6/1993 | Skeirik ......................... 395/22 |
| 5,228,780 A | 7/1993 | Shepard et al. ............. 374/175 |
| 5,235,527 A | 8/1993 | Ogawa et al. ......... 364/571.05 |
| 5,265,031 A | 11/1993 | Malczewski ................ 364/497 |
| 5,265,222 A | 11/1993 | Nishiya et al. ................. 395/3 |
| 5,269,311 A | 12/1993 | Kirchner et al. ............. 128/672 |
| 5,274,572 A | 12/1993 | O'Neill et al. ............. 364/550 |
| 5,282,131 A | 1/1994 | Rudd et al. ................. 364/164 |
| 5,282,261 A | 1/1994 | Skeirik ......................... 395/22 |
| 5,293,585 A | 3/1994 | Morita ......................... 395/52 |
| 5,303,181 A | 4/1994 | Stockton .................... 365/96 |
| 5,305,230 A | 4/1994 | Matsumoto et al. ........ 364/495 |
| 5,311,421 A | 5/1994 | Nomura et al. ............. 364/157 |
| 5,317,520 A | 5/1994 | Castle ........................ 364/482 |
| 5,327,357 A | 7/1994 | Feinstein et al. ............ 364/502 |
| 5,333,240 A | 7/1994 | Matsumoto et al. ......... 395/23 |
| 5,347,843 A | 9/1994 | Orr et al. ......................... 73/3 |
| 5,349,541 A | 9/1994 | Alexandro, Jr. et al. .... 364/578 |
| 5,357,449 A | 10/1994 | Oh ........................ 364/551.01 |
| 5,361,628 A | 11/1994 | Marko et al. ................. 73/116 |
| 5,365,423 A | 11/1994 | Chand ........................ 364/140 |
| 5,365,787 A | 11/1994 | Hernandez et al. ........... 73/660 |
| 5,367,612 A | 11/1994 | Bozich et al. ................ 395/22 |
| 5,384,699 A | 1/1995 | Levy et al. ............. 364/413.13 |
| 5,386,373 A | 1/1995 | Keeler et al. ............... 364/577 |
| 5,388,465 A | 2/1995 | Okaniwa et al. ......... 73/861.17 |
| 5,394,341 A | 2/1995 | Kepner .................. 364/551.01 |
| 5,394,543 A | 2/1995 | Hill et al. .................... 395/575 |
| 5,404,064 A | 4/1995 | Mermelstein et al. ....... 310/319 |
| 5,408,406 A | 4/1995 | Mathur et al. .............. 364/163 |
| 5,408,586 A | 4/1995 | Skeirik ......................... 395/23 |
| 5,414,645 A | 5/1995 | Hirano .................. 364/551.01 |
| 5,419,197 A | 5/1995 | Ogi et al. ..................... 73/659 |
| 5,430,642 A | 7/1995 | Nakajima et al. ........... 364/148 |
| 5,434,774 A | 7/1995 | Seberger .................... 364/172 |
| 5,436,705 A | 7/1995 | Raj ............................ 355/246 |
| 5,440,478 A | 8/1995 | Fisher et al. ................ 364/188 |
| 5,442,639 A | 8/1995 | Crowder et al. .......... 371/20.1 |
| 5,467,355 A | 11/1995 | Umeda et al. ......... 364/571.04 |
| 5,469,070 A | 11/1995 | Koluvek .................... 324/713 |
| 5,469,156 A | 11/1995 | Kogura ................. 340/870.38 |
| 5,469,735 A | 11/1995 | Watanabe ................. 73/118.1 |
| 5,469,749 A | 11/1995 | Shimada et al. ......... 73/861.47 |
| 5,481,199 A | 1/1996 | Anderson et al. ........... 324/705 |
| 5,483,387 A | 1/1996 | Bauhahn et al. ............ 359/885 |
| 5,485,753 A | 1/1996 | Burns et al. .................. 73/720 |
| 5,486,996 A | 1/1996 | Samad et al. ............... 364/152 |
| 5,488,697 A | 1/1996 | Kaemmerer et al. ......... 395/51 |
| 5,489,831 A | 2/1996 | Harris ........................ 318/701 |
| 5,495,769 A | 3/1996 | Broden et al. ................ 73/718 |
| 5,510,779 A | 4/1996 | Maltby et al. ............ 340/870.3 |
| 5,511,004 A | 4/1996 | Dubost et al. ......... 364/551.01 |
| 5,526,293 A | 6/1996 | Mozumder et al. ......... 364/578 |
| 5,539,638 A | 7/1996 | Keeler et al. ........... 364/424.03 |
| 5,548,528 A | 8/1996 | Keeler et al. ................ 364/497 |
| 5,560,246 A | 10/1996 | Bottinger et al. ......... 73/861.15 |
| 5,561,599 A | 10/1996 | Lu ............................... 364/164 |
| 5,570,300 A | 10/1996 | Henry et al. ............ 364/551.01 |
| 5,572,420 A | 11/1996 | Lu ............................... 364/153 |
| 5,573,032 A | 11/1996 | Lenz et al. .................. 137/486 |
| 5,591,922 A | 1/1997 | Segeral et al. ........... 73/861.04 |
| 5,598,521 A | 1/1997 | Kilgore et al. .............. 395/326 |
| 5,600,148 A | 2/1997 | Cole et al. ................ 250/495.1 |
| 5,608,650 A | 3/1997 | McClendon et al. ......... 364/510 |
| 5,623,605 A | 4/1997 | Keshav et al. .......... 395/200.17 |
| 5,633,809 A | 5/1997 | Wissenbach et al. ........ 364/510 |
| 5,637,802 A | 6/1997 | Frick et al. ................... 73/724 |
| 5,640,491 A | 6/1997 | Bhat et al. ..................... 395/22 |
| 5,661,668 A | 8/1997 | Yemini et al. ............... 364/550 |
| 5,665,899 A | 9/1997 | Willcox ...................... 73/1.63 |
| 5,669,713 A | 9/1997 | Schwartz et al. ............... 374/1 |
| 5,671,335 A | 9/1997 | Davis et al. .................. 395/23 |
| 5,672,247 A * | 9/1997 | Pangalos et al. .............. 162/65 |
| 5,675,504 A | 10/1997 | Serodes et al. ............. 364/496 |
| 5,675,724 A | 10/1997 | Beal et al. .............. 395/182.02 |
| 5,680,109 A | 10/1997 | Lowe et al. ................. 340/608 |
| 5,682,317 A | 10/1997 | Keeler et al. ........... 364/431.03 |
| 5,700,090 A | 12/1997 | Eryurek ....................... 374/210 |
| 5,703,575 A | 12/1997 | Kirkpatrick ............ 340/870.17 |
| 5,704,011 A | 12/1997 | Hansen et al. ................ 395/22 |
| 5,705,978 A | 1/1998 | Frick et al. .................. 340/511 |
| 5,708,211 A | 1/1998 | Jepson et al. ............ 73/861.04 |
| 5,708,585 A | 1/1998 | Kushion ................ 364/431.061 |
| 5,710,370 A | 1/1998 | Shanahan et al. ............ 73/1.35 |
| 5,713,668 A | 2/1998 | Lunghofer et al. .......... 374/179 |

| | | | | | | |
|---|---|---|---|---|---|---|
| 5,719,378 A | 2/1998 | Jackson, Jr. et al. ........ 219/497 | EP | 0 487 419 A2 | 5/1992 | |
| 5,736,649 A | 4/1998 | Kawasaki et al. ........ 73/861.23 | EP | 0 512 794 A2 | 5/1992 | |
| 5,741,074 A | 4/1998 | Wang et al. ................ 374/185 | EP | 0 594 227 A1 | 4/1994 | |
| 5,742,845 A | 4/1998 | Wagner ...................... 395/831 | EP | 0 624 847 A1 | 11/1994 | |
| 5,746,511 A | 5/1998 | Eryurek et al. ................. 374/2 | EP | 0 644 470 A2 | 3/1995 | |
| 5,747,701 A | 5/1998 | Marsh et al. ............ 73/861.23 | EP | 0 825 506 A2 | 7/1997 | |
| 5,752,008 A | 5/1998 | Bowling ...................... 395/500 | EP | 0 827 096 A2 | 9/1997 | |
| 5,764,891 A | 6/1998 | Warrior ................... 395/200.2 | EP | 0 838 768 A2 | 9/1997 | |
| 5,781,878 A | 7/1998 | Mizoguchi et al. .......... 701/109 | EP | 0 807 804 A2 | 11/1997 | |
| 5,801,689 A | 9/1998 | Huntsman ................... 345/329 | EP | 1058093 A1 | 5/1999 | |
| 5,805,442 A | 9/1998 | Crater et al. ................ 364/138 | EP | 1 022 626 A2 | 7/2000 | |
| 5,817,950 A | 10/1998 | Wiklund et al. ......... 73/861.66 | FR | 2 302 514 | 9/1976 | |
| 5,825,664 A * | 10/1998 | Warrior et al. ................. 700/7 | FR | 2 334 827 | 7/1977 | |
| 5,828,567 A | 10/1998 | Eryurek et al. ............. 364/184 | GB | 928704 | 6/1963 | |
| 5,829,876 A | 11/1998 | Schwartz et al. .............. 374/1 | GB | 1 534 280 | 11/1978 | |
| 5,848,383 A | 12/1998 | Yunus ........................ 702/102 | GB | 2 310 346 A | 8/1997 | |
| 5,859,964 A | 1/1999 | Wang et al. ........... 395/185.01 | GB | 2 347 323 A | 1/2000 | |
| 5,876,122 A | 3/1999 | Eryurek ...................... 374/183 | GB | 2342453 | 4/2000 | |
| 5,880,376 A | 3/1999 | Sai et al. ................. 73/861.08 | JP | 58-129316 | 8/1983 | |
| 5,887,978 A | 3/1999 | Lunghofer et al. ......... 374/179 | JP | 59-116811 | 7/1984 | |
| 5,908,990 A | 6/1999 | Cummings ............... 73/861.22 | JP | 59163520 | 9/1984 | |
| 5,923,557 A | 7/1999 | Eidson .................. 364/471.03 | JP | 59-211196 | 11/1984 | |
| 5,924,086 A | 7/1999 | Mathur et al. ................ 706/25 | JP | 59-211896 | 11/1984 | |
| 5,926,778 A | 7/1999 | Pöppel ....................... 702/130 | JP | 60-507 | 1/1985 | |
| 5,936,514 A | 8/1999 | Anderson et al. ...... 340/310.01 | JP | 60-76619 | 5/1985 | |
| 5,940,290 A | 8/1999 | Dixon ........................ 364/138 | JP | 60-131495 | 7/1985 | |
| 5,956,663 A | 9/1999 | Eryurek et al. ............. 702/183 | JP | 60174915 | 9/1985 | |
| 5,970,430 A | 10/1999 | Burns et al. ................ 702/122 | JP | 62-30915 | 2/1987 | |
| 6,014,902 A | 1/2000 | Lewis et al. ............. 73/861.12 | JP | 64-1914 | 1/1989 | |
| 6,016,523 A | 1/2000 | Zimmerman et al. ......... 710/63 | JP | 64-72699 | 3/1989 | |
| 6,016,706 A | 1/2000 | Yamamoto et al. ................ 9/6 | JP | 2-5105 | 1/1990 | |
| 6,017,143 A * | 1/2000 | Eryurek et al. ............... 700/51 | JP | 03229124 | 11/1991 | |
| 6,023,399 A | 2/2000 | Kogure ........................ 361/23 | JP | 5-122768 | 5/1993 | |
| 6,038,579 A | 3/2000 | Sekine ....................... 708/400 | JP | 06242192 | 9/1994 | |
| 6,045,260 A | 4/2000 | Schwartz et al. ........... 374/183 | JP | 7-63586 | 3/1995 | |
| 6,047,220 A | 4/2000 | Eryurek ...................... 700/28 | JP | 07234988 | 9/1995 | |
| 6,047,222 A | 4/2000 | Burns et al. .................. 700/79 | JP | 8-54923 | 2/1996 | |
| 6,052,655 A | 4/2000 | Kobayashi et al. ......... 702/184 | JP | 8-136386 | 5/1996 | |
| 6,072,150 A | 6/2000 | Sheffer .................. 219/121.83 | JP | 8-166309 | 6/1996 | |
| 6,112,131 A | 8/2000 | Ghorashi et al. ............ 700/142 | JP | 08247076 | 9/1996 | |
| 6,119,047 A | 9/2000 | Eryurek et al. ............... 700/28 | JP | 2712625 | 10/1997 | |
| 6,119,529 A | 9/2000 | DiMarco et al. ......... 73/861.68 | JP | 2712701 | 10/1997 | |
| 6,139,180 A | 10/2000 | Usher et al. .................... 374/1 | JP | 2753592 | 3/1998 | |
| 6,151,560 A | 11/2000 | Jones .......................... 702/58 | JP | 07225530 | 5/1998 | |
| 6,179,964 B1 * | 1/2001 | Begemann et al. .......... 162/198 | JP | 10-232170 | 9/1998 | |
| 6,192,281 B1 | 2/2001 | Brown et al. ................... 700/2 | JP | 11083575 | 3/1999 | |
| 6,195,591 B1 | 2/2001 | Nixon et al. .................... 700/2 | WO | WO 94/25933 | 11/1994 | |
| 6,199,018 B1 | 3/2001 | Quist et al. .................... 702/34 | WO | WO 96/11389 | 4/1996 | |
| 6,236,948 B1 | 5/2001 | Eck et al. ...................... 702/45 | WO | WO 96/12993 | 5/1996 | |
| 6,263,487 B1 | 7/2001 | Stripf et al. ..................... 717/1 | WO | WO 96/39617 | 12/1996 | |
| 6,298,377 B1 | 10/2001 | Hartikainen et al. ......... 709/223 | WO | WO 97/21157 | 6/1997 | |
| 6,311,136 B1 | 10/2001 | Henry et al. ................... 702/45 | WO | WO 97/25603 | 7/1997 | |
| 6,327,914 B1 | 12/2001 | Dutton .................. 73/861.356 | WO | WO 98/06024 | 2/1998 | |
| 6,347,252 B1 | 2/2002 | Behr et al. ...................... 700/3 | WO | WO 98/13677 | 4/1998 | |
| 6,360,277 B1 | 3/2002 | Ruckley et al. ............. 709/250 | WO | WO 98/20469 | 5/1998 | |
| 6,370,448 B1 | 4/2002 | Eryurek ...................... 700/282 | WO | WO 98/39718 | 9/1998 | |
| 6,397,114 B1 | 5/2002 | Eryurek et al. ............... 700/51 | WO | WO 99/19782 | 10/1998 | |
| 6,425,038 B1 | 7/2002 | Sprecher .................... 710/269 | WO | WO 00/55700 | 3/2000 | |
| 2003/0033040 A1 * | 2/2003 | Billings ........................ 700/97 | WO | WO 00/70531 | 11/2000 | |

FOREIGN PATENT DOCUMENTS

| | | |
|---|---|---|
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |

OTHER PUBLICATIONS

International Search Report for International application No. PCT/US 02/14560, filed May 8, 2002, Search Report dated Sep. 3, 2002.

Journal of Intelligent Manufacturing (1997) 8, 271–276 article entitled "On–line tool condition monitoring system with wavelet fuzzy neural network".

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1–70.

"Automation On–line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding FOUNDATION™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Control?", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by, Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Managemnet Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

Parallel, Fault–Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software–Based Fault–Tolerant Control Design for Improved Power Plant Operation," *IEEE/IFAC Joint Symposium on Computer–Aided Control System Design*, Mar. 7–9, 1994 pp. 585–590.

A Standard Interface for Self–Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1–4.

"Application of Neural Computing Paradigms for Signal Validation," by B.R. Upadhyaya et al., *Department of Nuclear Engineering*, pp. 1–18.

"Application of Neural Networks for Sensor Validation and Plant Monitoring," by B. Upadhyaya et al., *Nuclear Technology*, vol. 97, No. 2, Feb. 1992 pp. 170–176.

"Automated Generation of Nonlinear System Characterization for Sensor Failure Detection," by B.R. Upadhyaya et al., *ISA*, 1989 pp. 269–274.

"In Situ Claibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600° C", by M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Field-based Architecture is Based on Open Systems, Improves Plant Performance", by P. Cleaveland, *I&CS*, Aug. 1996, pp. 73–74.

"Tuned-Circuit Dual-Mode Johnson Noise Thermometers," by R.L. Shepard et al., Apr. 1992.

"Tuned-Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

"Wavelet Analysis of Vibration, Part 2: Wavelet Maps," by D.E. Newland, *Journal of Vibration and Acoustics*, vol. 116, Oct. 1994, pp. 417–425.

"Development of a Long-Life, High-Reliability Remotely Operated Johnson Noise Thermometer," by R.L. Shepard et al., *ISA*, 1991, pp. 77–84.

"Application of Johnson Noise Thermometry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–1—50–6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"Development and Application of Neural Network Algorithms For Process Diagnostics," by B.R. Upadhyaya et al., *Proceedings of the 29th Conference on Decision and Control*, 1990, pp. 3277–3282.

"A Fault-Tolerant Interface for Self-Validating Sensors", by M.P. Henry, *Colloquium*, pp. 3/1–3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151–162.

"Thermocouple Continuity Checker," IBM Technical Disclosure Bulletin, vol. 20, No. 5, pp. 1954 (Oct. 1977).

"A Self–Validating Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurements," by T.J. Claggett, pp. 266–333 (1982).

"emWare's Releases EMIT 3.0, Allowing Manufacturers to Internet and Network Enable Devices Royalty Free," 3 pages, PR Newswire (Nov. 4, 1998).

Warrier, J., "The IEEE P1451.1 Object Model Network Independent Interfaces for Sensors and Actuators," pp. 1–14, Rosemount Inc. (1997).

Warrier, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.—Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47–49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36 (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcompuer–Based Instrument for Applications in Platinum Resistance Thermomety," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Stimulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Actutors, pp. 115–119 (1991).

"Ein Emulationssystem zur Leitstungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziele und Anwndungen von Feldbussystemen," by T. Pfeifer et al., pp. 549–557 (10/87).

"PROFIBUS–Infrastrukturmaβnahmen," by Tilo Pfeifer et al., pp. 416–419 (8/91).

"Simulation des Zeitverhaltens von Feldbussystemen," by O. Schnelle, pp. 440–442 (1991).

"Modélisation et simulation d'un bus de terrain: FIP," by Song et al, pp. 5–9 (undated).

"Feldbusnetz für Automatisierungssysteme mit intelligenten Funktionseinheiten," by W. Kriesel et al., pp. 486–489 (1987).

"Bus de campo para la inteconexión del proceso con sistemas digitales de control," Tecnología, pp. 141–147 (1990).

"Dezentrale Installation mit Echtzeit–Feldbus," Netzwerke, Jg. Nr.3 v. 14.3, 4 pages (1990).

"Process Measurement and Analysis," by Liptak et al., Instrument Engineers' Handbook, Third Edition, pp. 528–530, (1995).

"Improving Dynamic Performance of Temperature Sensors With Fuzzy Control Techniques," by Wang Lei et al., pp. 872–873 (1992).

IEEE Transactions on Magnetics, vol. 34, No. 5, Sep. 1998, "Optical Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurement, "New approach to a main error estimation for primary transducer of electromagnetic flow meter," pp. 1093–1097.

"Additional Information From Flowmeters via Signal Analysis," by J.E. Amadi–Echendu and E.H. Higham, pp. 187–193.

"Notification of Transmittal of the International Search Report or the Declaration" for PCT/US01/40791.

"Notification of Transmittal of the International Search Report or the Declaration" for PCT/US01/40782.

\* cited by examiner

CONTROL SYSTEM USING PROCESS MODEL

BACKGROUND OF THE INVENTION

The present invention relates to industrial process control. More specifically, the present invention relates to controlling processes which are used to manufacture paper or paper pulp.

In a control system, including controls systems which are used to control paper and paper pulp manufacturing, the state of a process is monitored by measuring "process variables." A process variable refers to a variable which is related to the condition of the process such as a flow rate, a level, a temperature, a pressure, etc. Based upon the measured process variable, a controller operates a control element in order to bring the process variable within a target range. For example, in order to achieve a desired flow rate (process variable) a controller adjusts a valve (control element) accordingly.

One type of process control observes the quality of the product output to adjust the various process variables within the process. The quality measurement is a process variable which is measured at the output of the process. It can be difficult to control paper and pulp manufacturing processes using this technique because there is both a physical distance between the process output and a significant lag time due to the time it takes for a product to move through the process. The physical separation and the separation in time can make controlling the process to achieve a desired quality difficult.

SUMMARY OF THE INVENTION

A control system is provided for controlling a process for making paper or paper pulp. The process has a process product output at an end of the process. The controls include a process variable sensor input configured to receive a process variable related to the process. The controller is configured to provide a control signal to control the process. A process model has a model product output which is a model representation of the process product output. The model process output is a function of the sensed process variable and a product output setpoint representative of a desired process product output. The control signal is a function of the product output setpoint and the modeled product output.

DETAILED DESCRIPTION OF THE PREFERRED EMBODIMENTS

Typical process control techniques in paper or paper pulp manufacturing rely on the feedback of the product quality to adjust the physical setpoints of the process variables within the manufacturing process. Such measurements are made at the output of the process. Although there are other process variable sensors located at various points along the process, they are typically only used for controlling an immediate process variable, such as a level, to thereby regulate the setpoints for a physical parameter as determined by a process control loop.

With this configuration, it is difficult to control product quality which is typically measured at the output of the process. The process output may be hundreds of feet away from the rest of the process and corrections can only be made after the fact. Any product output which is out of specification is discarded. Further, due to the dead time associated with the disparate locations between sensors and actuators, the control system cannot tolerate high gain in the control loop. With the present invention, a model is used to model the output of the process based upon one or more process variables measured at one or more locations along the process. The output of the model can be indicative of a quality measurement which related to the quality of the output product which will be obtained if the current process setpoints or control algorithms are not changed. Thus, the model is used to provide an inferred measurement related to a modeled product output. Based upon this inferred measurement related to the "quality" of the process output, the up stream process setpoints or control algorithms can be adjusted accordingly. In a more advanced embodiment, the information from the model can be used to coordinate distributed control algorithms which communicate on local process control loops in which control elements are controlled based upon local surrogate measurements.

The present invention can reduce the dead time between the control element and the surrogate or inferred measurements such that increased loop gain can be used in the control algorithms to improve the performance of the control loop without destabilizing the process. Further, a deviation in the product quality can be detected prior to actually producing the product and the control algorithms or setpoints can be adjusted to correct and compensate for the variation before the product exits the process. Integration of feed forward control, integrated sensors and inferred measurements with this feedback control technique provide improved control of the process and the quality of the output.

Figure 1:
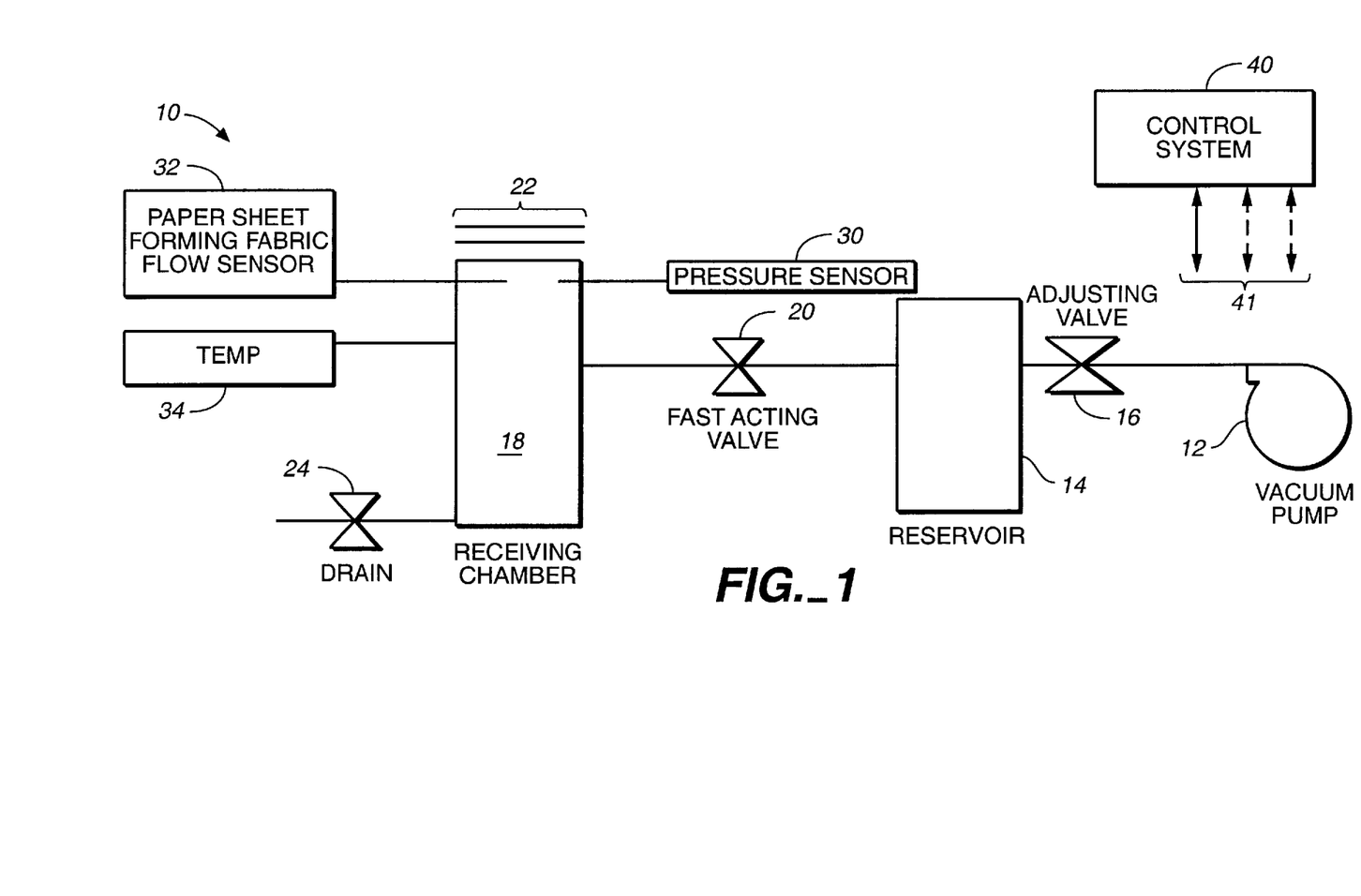
FIG. 1 is a simplified diagram showing a portion of a paper manufacturing process.

FIG. 1 is a simplified diagram showing one aspect of a paper sheet fabrication process. In this simplified embodiment, a vacuum pump 12 is coupled to a reservoir 14 through an adjusting valve 16. A receiving chamber 18 couples to the reservoir 14 through a fast acting valve 20 and is configured to receive a supply of paper sheets 22 through a manufacturing process. A drain valve 24 is configured to drain the reservoir 18. A pressure sensor 30, flow sensor 32 and temperature sensor 34 are configured to measure the pressure, flow rate and temperature associated with chamber 18. Information from sensors 30, 32 and 34 are provided to control system 40 which operates in accordance with the present invention.

In operation, control system 40 has at least one process variable input configured to receive a process variable from a process variable sensor such as sensors 30, 32 or 34. Sensors 30, 32 and 34 can be process variable transmitters coupled to a process control loop such as a two wire process control loop. As discussed below, control system 40 includes a process model and controls the quality of the paper produce manufactured by the process based upon an output from the model and a setpoint. This control is achieved by controlling a control element such as drain 24, fast acting valve 20 or adjusting valve 16. In the process illustrated in FIG. 1, paper sheets are received in receiving chamber 18 and are dried through the operation of drain 24 and vacuum supplied by vacuum pump 12. Excess liquid is collected in reservoir 14. The particular setpoints of the process used to dry the paper 22 can detrimentally effect the quality of the paper produced by the process.

Figure 2:
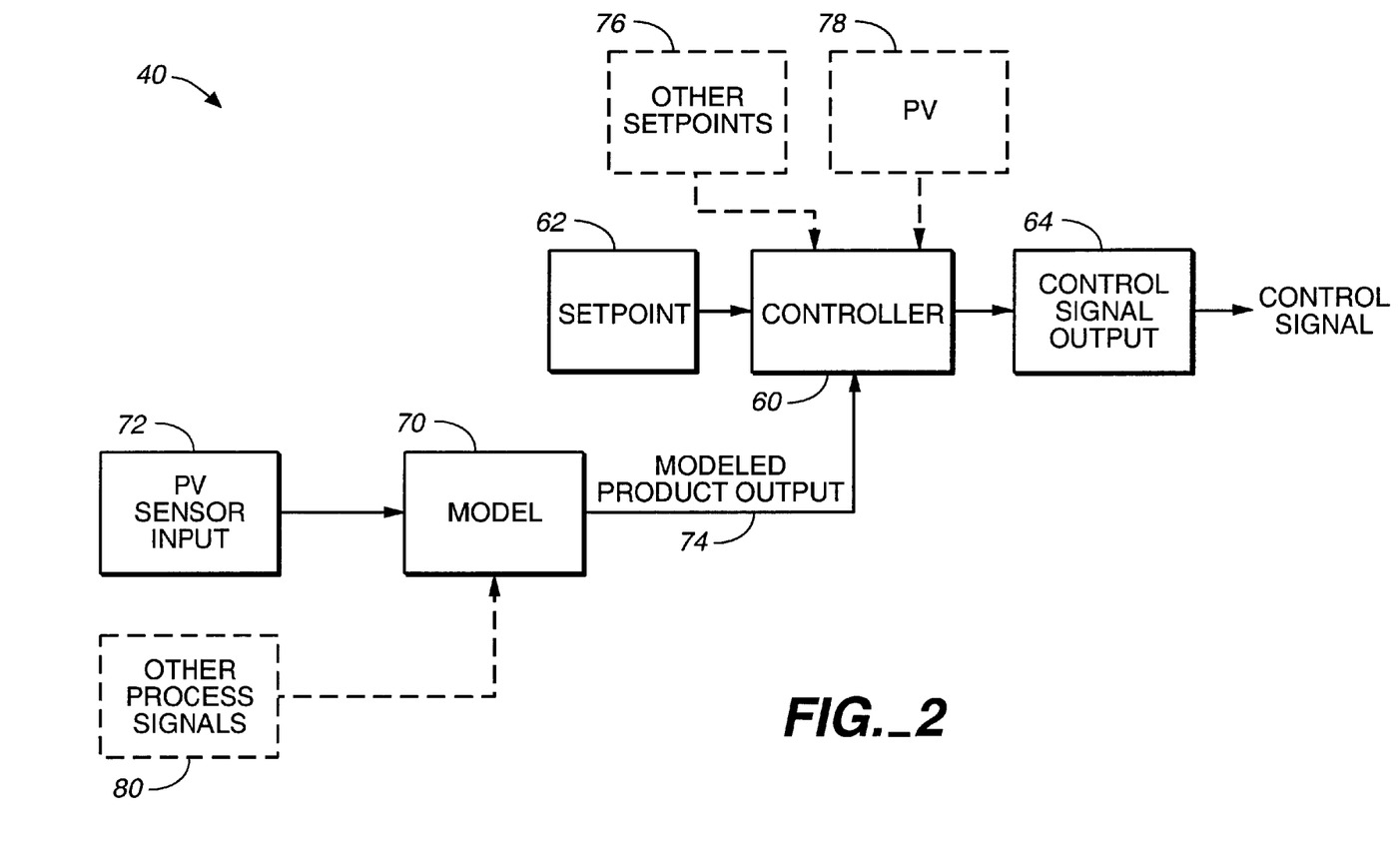
FIG. 2 is a simplified block diagram of a control system in accordance with one embodiment of the invention.

Pursuant to one embodiment of the invention, FIG. 2 is a simplified block diagram of control system 40 used, for example, in the process illustrated in FIG. 1. The control system can couple to process devices (sensors or control elements) through one or more process control loops 41. Example control loops include two-wire loops such as 4–20 mA loops, loops in accordance with the Fieldbus standards, HART standards and others. Control system 40 includes a controller 60 which receives a setpoint 62 and provides a control signal output to a control element, such as one of the control elements illustrated in FIG. 1. In accordance with the present invention, control system 40 includes a process model 70 which receives a process variable sensor input 72 and provides a modeled product output 74 to controller 60. As discussed above, controller 60 controls one or more control elements in the process based upon the modeled product output 74 and the setpoint 62. The controller 60 can operate using any control algorithm including neural networks, regressive learning techniques, fuzzy logic, rules, any type of proportional integral and/or derivative control, etc. The present invention is not limited to the particular algorithm or technique implemented in a controller which is used to process the modeled product output. Controller 60 can receive other setpoints 76 and one or more process variables 78 and the control signal output 64 can be a function of these additional inputs. Model 70 can provide the modeled product output 74 as a function of other process signals 80. Examples of other process signals include other process variables, process setpoints, control signals, information related to the type or operation of a particular process sensor or control element, date or time information or any other information related to the operation of the process. The model can be preconfigured or can be generated using learning techniques such as that provided through the use of a neural network.

Figure 3:
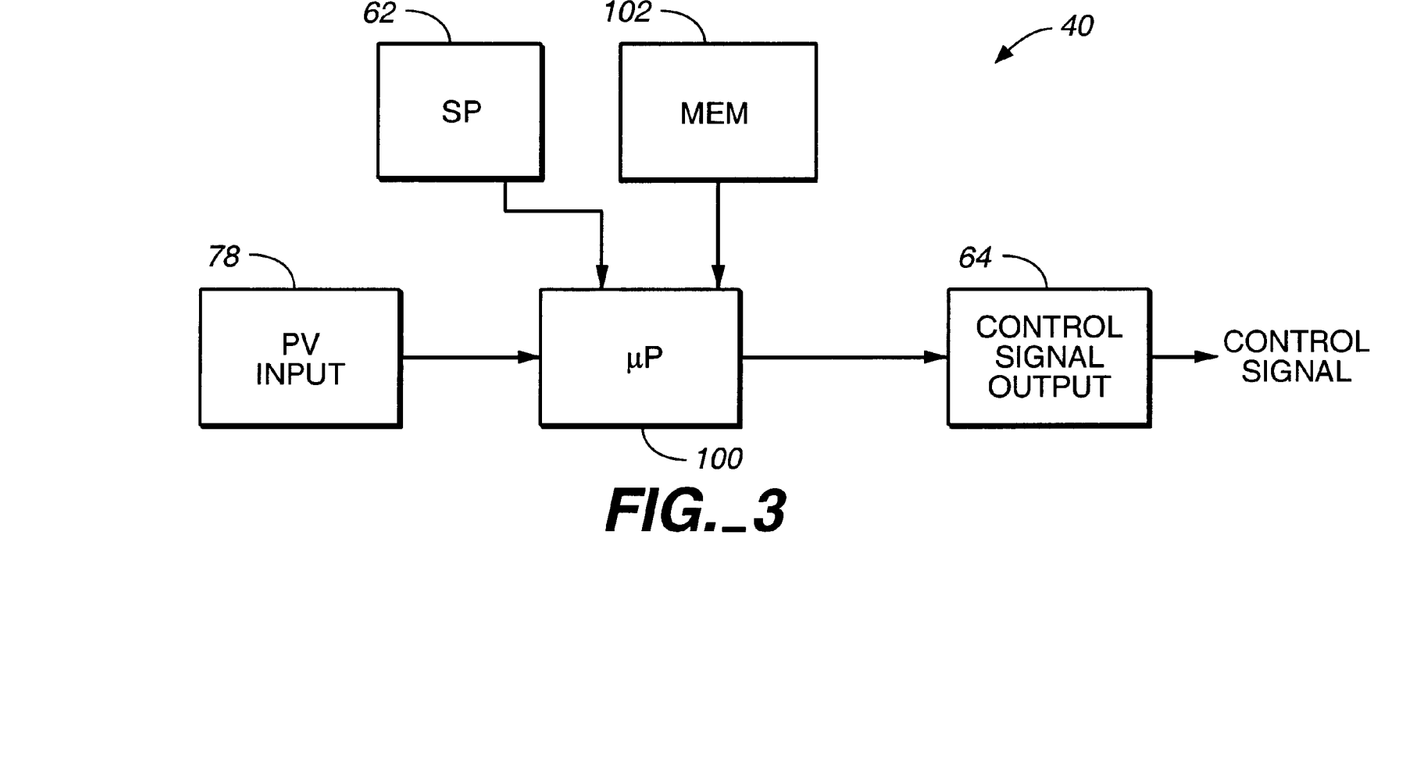
FIG. 3 is a simplified block diagram showing a microprocessor used to implement the control system of FIG. 2.

FIG. 3 is a simplified block diagram of control system 40 showing one example physical configuration of the control system. In the example of FIG. 3, control system 40 utilizes a microprocessor 100. Microprocessor 100 is configured to receive setpoint 62 which can be stored in memory, such as memory 102. Memory 102 can also contain permanent and/or temporary values such as used for programming or for storing program instructions or temporary storage. The process variable input can be through any type of physical layer such as through standard communication protocols. Example protocols include two-wire based protocols such as HART or Fieldbus. However, the control system can receive the process variable information, or other data, using any appropriate technique. Similarly, the control signal output can be implemented in any type of hardware including hardware which operates in accordance with process control industry standards. Example standards include two-wire based standards such as HART or Fieldbus. However, the control signal output 64 can be in accordance with any appropriate technique.

Although the present invention has been described with reference to preferred embodiments, workers skilled in the art will recognize that changes may be made in form and detail without departing from the spirit and scope of the invention. The present invention can be implemented in process devices located in the field, or in process devices or controls located at a remote location such as a control room or distant facility. Any appropriate hardware and/or software can implement the present invention including personal computers, microprocessors at various locations or configurations, etc. The invention can be implemented in any appropriate process device 40 including the illustrated control system or other devices which have access to process variables such as transmitters or controllers. The device can be at a remote location or in close physical proximity to a process variable sensor.

What is claimed is:

1. A control system for controlling a process for making paper or paper pulp having a process product output at an end of the process, comprising:

a process variable sensor input configured to receive a plurality of process variables related to the process for making paper or pulp paper sensed by a process variable sensor which provides a process variable output, the plurality of process variables measured at a plurality of locations along this process;

a control element output configured to provide a control signal to a control element which controls the process in response to the control signal;

a process model having a model product quality output comprising an inferred measurement of product quality output, the model product quality output comprising a model representation of the process product output in response to the sensed process variables, the process model based upon current process setpoints and current process control algorithms which are directly included in the process model;

a product output quality setpoint representative of a desired process product output quality;

a controller configured to compare the product output setpoint to the modeled product output and responsively provide the control signal to the control element; and wherein the process variable sensor input couples to a two-wire process control loop.

2. The control system of claim 1 wherein the model comprises a plurality of rules which model the process.

3. The control system of claim 1 wherein the model comprises a neural network which models the process.

4. The control system of claim 1 wherein the model comprises fuzzy logic which models the process.

5. The control system of claim 1 wherein the process variable sensor is in a first two-wire control loop, the control element is in a second two-wire control loop which is down stream from the first two-wire control loop, and wherein the controller corrects for process variations in the first two-wire control loop by adjusting the control element to achieve a desired product quality in the process product output.

6. The control system of claim 1 wherein the controller provides feed forward control as a function of the model product output.

7. The control system of claim 1 wherein the model is implemented in a microprocessor based system.

8. The control system of claim 1 wherein the model is implemented in a process device in physical proximity to the process variable sensor.

9. The control system of claim 1 wherein the process model is coupled to the process variable sensor over a control loop which operates in accordance with Fieldbus.

10. The control system of claim 1 wherein the model is a function of an observed process history.

11. A method for controlling a process for making paper or paper pulp, the process of the type having a process product output at the end of the process, comprising:

obtaining a plurality of process variables related to the process from a two-wire process control loop, the plurality of process variables measured at a plurality of locations along the process;

modeling the process product output quality, the modeled process product output quality comprising an inferred measurement of product quality as a function of at least the obtained process variables, the process model based upon current process setpoints and current process control algorithms which are directly included in the process model;

obtaining a setpoint related to a desired process product output quality; and generating a control signal as a function of the modeled process product output quality and the setpoint.

12. The method of claim 11 wherein the modeling is based upon a plurality of rules.

13. The method of claim 11 wherein the modeling is based upon a neural network.

14. The method of claim 11 wherein the modeling is based upon fuzzy logic.

15. The method of claim 11 wherein the control signal is generated to correct for potential future deviations in the process product output.

16. The method of claim 11 wherein the modeling is a function of an observed process history.

17. The method of claim 11 including adjusting the process setpoints and control algorithms based upon the modeled process product output quality.

18. The control system of claim 1 wherein the controller coanges the process setpoints and control algorithms based upon the model product output quality.

* * * * *

UNITED STATES PATENT AND TRADEMARK OFFICE
CERTIFICATE OF CORRECTION

PATENT NO. : 6,772,036 B2  
DATED : August 3, 2004  
INVENTOR(S) : Eryurek et al.

Page 1 of 1

It is certified that error appears in the above-identified patent and that said Letters Patent is hereby corrected as shown below:

Title page,  
Item [56], References Cited, U.S. PATENT DOCUMENTS, insert

```
-- 09/169,873   10/12/98   Eryurek et al.
   09/175,832   10/19/98   Eryurek et al.
   09/257,896   02/25/99   Eryurek et al.
   09/303,869   05/03/99   Eryurek et al.
   09/335,212   06/17/99   Kirkpatrick et al.
   09/344,631   06/25/99   Eryurek et al.
   09/360,473   07/23/99   Eryurek et al.
   09/369,530   08/06/99   Eryurek et al.
   09/383,828   08/27/99   Eryurek et al.
   09/384,876   08/27/99   Eryurek et al.
   09/406,263   09/24/99   Kirkpatrick et al.
   09/409,098   09/30/99   Eryurek et al.
   09/409,114   09/30/99   Eryurek et al.
   09/565,604   05/04/00   Eruyrek et al.
   09/576,450   05/23/00   David L. Wehrs
   09/606,259   06/29/00   Evren Eryurek
   09/616,118   07/14/00   Eryurek et al.
   09/627,543   07/28/00   Eryurek et al.
   09/576,719   05/23/00   Coursolle et al.
   09/799,824   03/05/01   Rome et al.
   09/855,179   05/14/01   Eryurek et al.    --
```

OTHER PUBLICATIONS, "In Situ Claibration of Nuclear Plant Platinum Resistance Thermometers Using Johnson Noise Methods" reference, delete "claibration" and insert -- calibration --.  
"Computer Stimulation of H1 Field Bus Transmission," reference, delete "stimulation" and insert -- simulation --.

Column 6,  
Line 12, delete "coanges" and insert -- changes --.

Signed and Sealed this

Twenty-fifth Day of January, 2005

JON W. DUDAS  
*Director of the United States Patent and Trademark Office*

UNITED STATES PATENT AND TRADEMARK OFFICE
CERTIFICATE OF CORRECTION

PATENT NO. : 6,772,036 B2
DATED : August 3, 2004
INVENTOR(S) : Eryurek et al.

It is certified that error appears in the above-identified patent and that said Letters Patent is hereby corrected as shown below:

<u>Title page,</u>
Item [56], References Cited, U.S. PATENT DOCUMENTS, insert
-- 09/852,102    05/09/01    Eryurek --

Signed and Sealed this

Twenty-first Day of June, 2005

JON W. DUDAS
*Director of the United States Patent and Trademark Office*